United States Patent [19]
Jones

[11] 3,916,465
[45] *Nov. 4, 1975

[54] MULTI-STREAM GAS CHROMATOGRAPHIC METHOD AND APPARATUS

[75] Inventor: A. William Jones, Wilson, N.Y.

[73] Assignee: Hooker Chemicals & Plastics Corporation, Niagara Falls, N.Y.

[ * ] Notice: The portion of the term of this patent subsequent to Apr. 2, 1991, has been disclaimed.

[22] Filed: Mar. 11, 1974

[21] Appl. No.: 449,820

Related U.S. Application Data

[63] Continuation-in-part of Ser. No. 301,032, Oct. 26, 1972, Pat. No. 3,800,602.

[52] U.S. Cl. .............................. 73/23.1; 73/422 GC
[51] Int. Cl. ............................................ G01N 1/22
[58] Field of Search ...................... 73/422 GC, 23.1

[56] References Cited
UNITED STATES PATENTS

| | | |
|---|---|---|
| 2,846,121 | 8/1958 | Ronnebeck .................... 73/422 GC |
| 3,112,639 | 12/1963 | Maxwell .............................. 73/23.1 |
| 3,116,642 | 1/1964 | Weir .............................. 73/422 GC |
| 3,150,517 | 9/1964 | Kuffer .................................. 73/23.1 |
| 3,267,736 | 8/1966 | Boettger .......................... 73/422 GC |
| 3,447,360 | 6/1969 | Laseter ................................ 73/23.1 |
| 3,489,011 | 1/1970 | Firman et al. ......................... 73/422 |
| 3,800,602 | 4/1974 | Jones ................................... 73/422 |

Primary Examiner—S. Clement Swisher
Attorney, Agent, or Firm—Peter F. Casella

[57] ABSTRACT

Apparatus and method for rapid chromatographic analysis of liquid or gaseous mixtures. The apparatus includes a programming valve comprising a valve block having six ports and at least one channel, and a valve plate member slidably affixed thereto. The valve block and plate are movable between two positions whereby in a first position there is permitted simultaneous sampling of the stream to be analyzed and back flushing of the chromatographic column, and in a second position rapid analysis of the sample.

8 Claims, 3 Drawing Figures

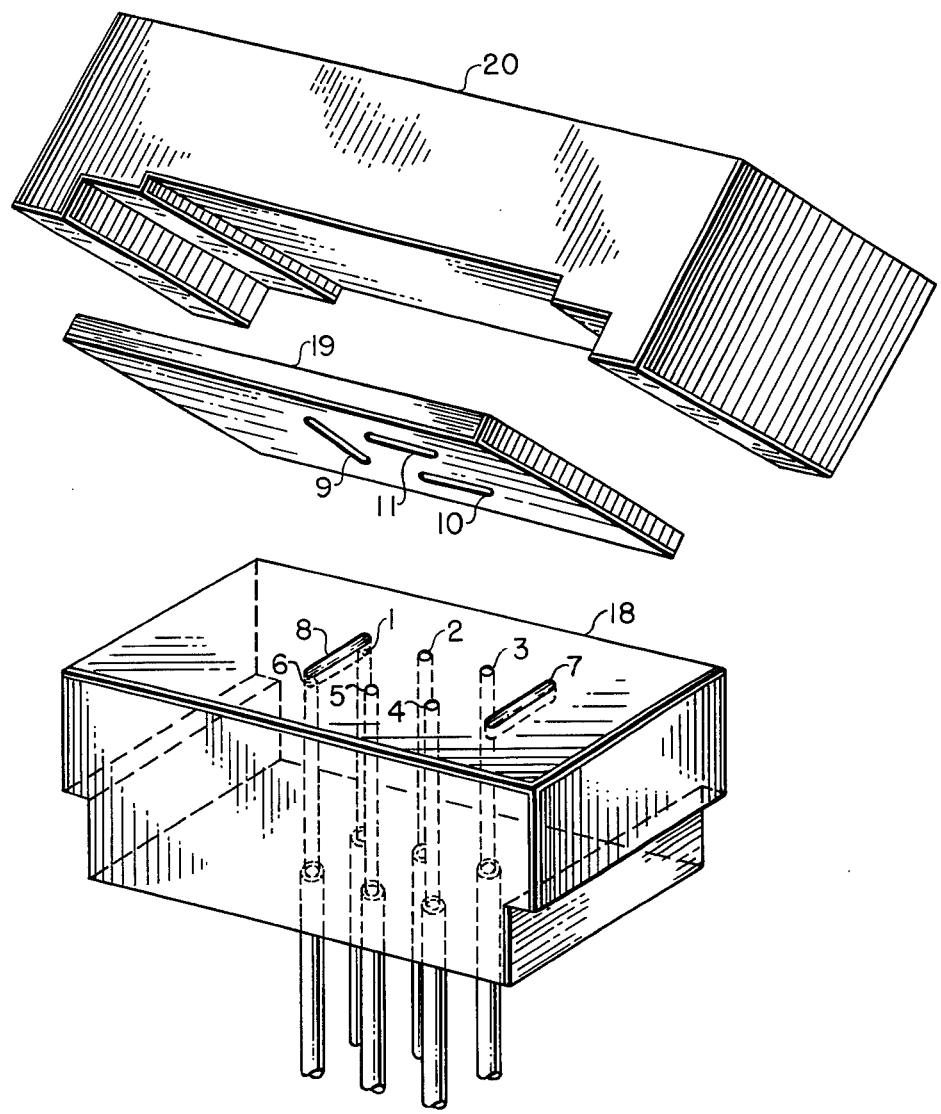

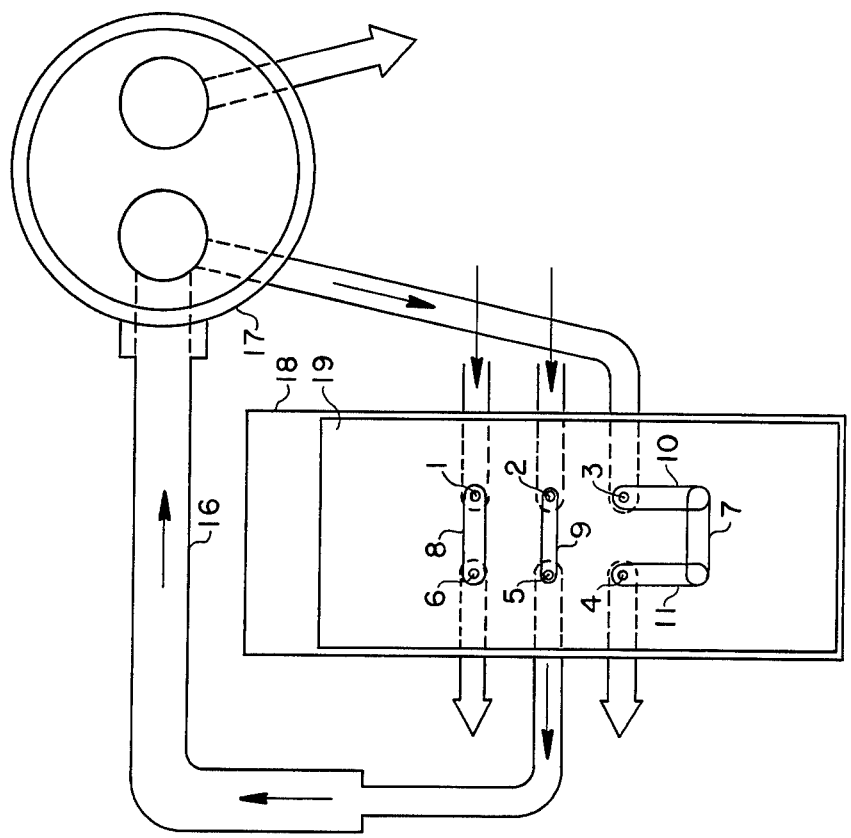
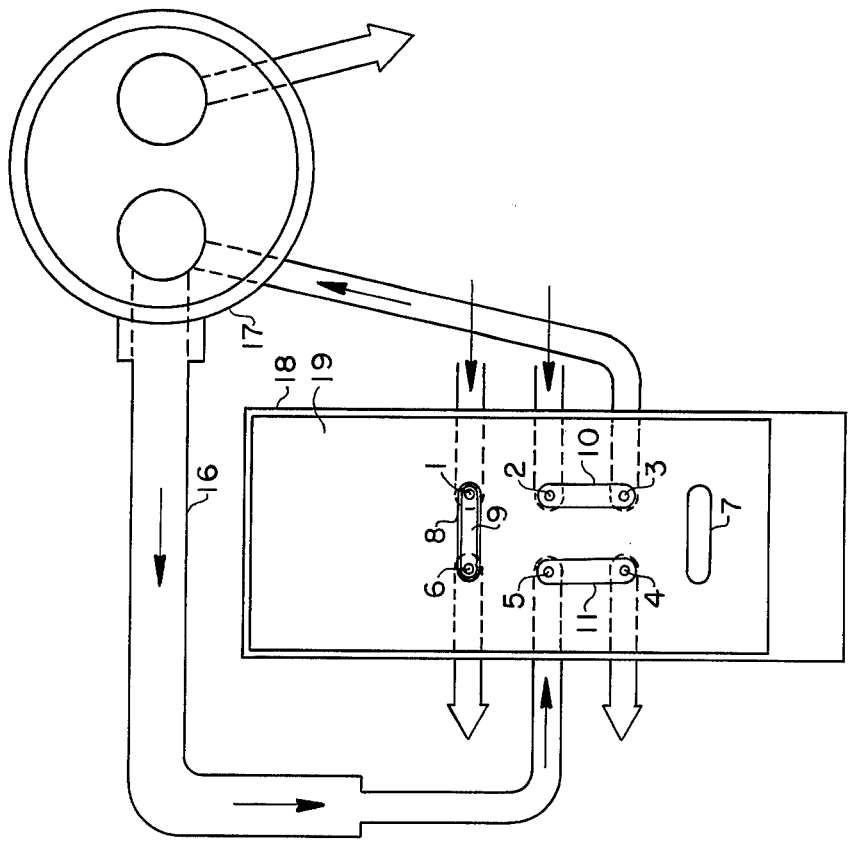

MULTI-STREAM GAS CHROMATOGRAPHIC METHOD AND APPARATUS

CROSS REFERENCE TO RELATED APPLICATIONS

This application is a continuation-in-part of patent application Ser. No. 301,032 to A. William Jones, filed Oct. 26, 1972, now U.S. Pat. No. 3,800,602 issued Apr. 2, 1974.

BACKGROUND OF THE INVENTION

This invention relates to gas chromatography. More particularly, it relates to an arrangement of components comprising an improved programming valve, a single chromatographic column and a detector means arrangement for rapid analysis of liquid and gaseous mixtures.

Gas chromatography is an analytical technique widely used for the qualitative and quantitative analysis of liquid and gaseous mixtures. In recent years this technique has become increasingly important in determining components present in a sample to be analyzed. In general, a sample of a mixture is obtained from a stream to be analyzed and passed through one or more columns wherein the components are separated and then separately passed to a detector which measures the separated components of the mixture in order of their elution times. Columns may be then backflushed to remove any retained components from the column.

It is known to provide means such as sampling valve wherein a small sample of a liquid or a gaseous mixture is measured and then carried into the column by means of a carrier gas, in which column the components of the mixture are separated and gradually eluted from the column into the detector means. In the chromatographic analysis of a sample containing both easily and difficultly eluted components, the more rapidly eluted component is separated and passed into the detector well before the more difficultly eluted component leaves the chromatographic column. When this type of analysis is being run, it is known practice to backflush the chromatographic column with a stream of carrier gas or a suitable flushing gas to remove the retained components through the inlet end of the chromatographic column. Backflushing of this type frees the column for another analysis. Suitable valving and lines must be supplied in addition to the basic apparatus to permit this backflushing.

In many chromatographic analyses two or more chromatographic columns are connected in series. It is also known to provide one or more valves programming the several carrier and backflushing gas streams as well as sample streams to efficiently operate the chromatographic analysis. Such arrangements as are presently known, involving several columns and/or several valves, are time consuming and add to the equipment and maintenance costs.

When the stream to be analyzed is gas, and a relatively large sample is suitable, it is known to use a sample valve having an external sample loop comprising a section of tubing in which a measured amount of the gas can be collected prior to analysis, and then carried to a chromatographic column by a carrier gas. However, when the sample to be analyzed is a liquid or when it is preferred to utilize a small gaseous sample, apparatus which provides an external sample loop in which to collect a measured amount of sample is frequently unsuitable since external sample loops are commonly too large to measure an appropriately small sample. To provide external loops of suitable volume would require the use of tubing of extremely small inside diameter, such as capillary tubing which would restrict the flow of sample. Sampling valves for such use commonly have a groove of measured volume incorporated within the valve so that an appropriate volume of sample, too small to be measured conveniently and accurately in an external loop of tubing, can be carried into the column. It is known to use such sampling means in conjunction with separate column-switching and backflushing means. The use of separate column-switching and backflushing means results in method which is generally less efficient and more time-consuming and costly.

OBJECTS OF THE INVENTION

It is therefore a primary object of the present invention to provide an improved gas chromatographic method for separating and measuring components from a liquid or gas stream.

Another object of the present invention is to provide such a method which utilizes an improved programming valve.

It is also an object of the present invention to provide a gas chromatographic apparatus comprising a six port programming valve which performs simultaneous sampling and backflushing.

Another object is to provide a method and apparatus for chromatographic analysis which requires only one detector and column or column series for analysis of several streams.

It is still a further object of the present invention to provide a gas chromatographic apparatus comprising a six port programming valve providing simultaneous sampling and backflushing arrangements, such that samples too small to be sampled in a section of tubing can be obtained and analyzed rapidly and efficiently.

These and other objects and advantages of the present invention will become apparent from the following specification.

SUMMARY OF THE INVENTION

The apparatus for the present invention comprises a six port programming valve for use with a chromatographic column and a detector means communicating with a column at one end and at the other end with the programming valve. The programming valve includes a valve block having six ports or apertures therein for enabling respective communication with one carrier medium and a liquid or gaseous sample medium, a movable valve plate member mounted on one face of the valve block and urged into sliding contact by a valve plate carrier and tensioning means slidably affixed such that the passages form a gas tight system. The valve plate is provided with a plurality of apertures or channels for selective communication with predetermined ports of the valve block. The valve block is provided also with at least one channel which communicates selectively with predetermined channels of the valve plate. The valve plate is movable by the valve plate carrier to one or another of two positions on the valve block. The valve plate carrier may be operated manually or by automatic means.

In a first position, the sample stream flows into the valve block through a sample channel of measured volume in the valve plate, back into the block, filling the sample channel therein continuously with fresh sample. Simultaneously, the carrier gas flows into the valve block, over a communicating channel in the valve plate, out of the block into the detector and back through the column, flushing out the column, thence back into the block, over a communicating channel of the valve plate, and out of the block to the vent.

In the second position the carrier gas flows into the block through the sample channel of the valve plate, picking up the measured amount of the sample, out of the block into the column, wherein components of the sample are separated. The carrier gas elutes lighter components of the gas sample from the column through the detector wherein the eluted components of interest are measured, and then flows from the detector back into the valve block, over the communicating channel of the valve plate through a channel in the block, another channel in the plates, back into the block, and out of the block to the vent. A communicating channel may be incorporated in either the valve plate or block to permit uninterrupted flow of the sample stream through the valve, by-passing the sample channel during this time.

The valving technique herein described enables one six port valve to permit sampling and analysis of a liquid or gaseous mixture and also backflushing of the column. It also permits carrying a stream directly to the detector from the column without intervening passages or conduits. In addition to simplicity, rapidity is gained. In most instances, the analysis is accomplished in a matter of seconds rather than minutes as in known chromatographic methods. It will be apparent that this procedure and apparatus eliminates most causes of peak broadening, since the eluted material flows directly from the column to the detector rather than through intervening apparatus units.

A still further advantage is obtained from the apparatus and valving technique of the present invention through the use of a two-position rather than a multiple-position valve to accomplish simultaneous sample collection and backflushing of the column in one position and analysis of the sample in the second position. In this manner, a simpler, more efficient valve design is employed whereby the valve plate may be selectively moved to either position by a full movement to a solid stop in the appropriate direction. Thus, intermediate stops are unnecessary and the possible occurrence of misalignment is minimized.

DETAILED DESCRIPTION OF THE INVENTION

A better understanding of the method and apparatus of the present invention may be had from the following description of the construction and operation of several embodiments thereof and illustrated by the accompanying drawings in which:

FIG. 1 is an exploded view of combined sampling and backflushing valve portion of the apparatus of the present invention.

FIG. 2 is a schematic view of an embodiment of the apparatus of the present invention in its backflushing and sample loading position.

FIG. 3 is a schematic view of the same embodiment of the apparatus of the present invention in its sample injection and analyzing position.

With reference to FIG. 1, it will be seen that the valve comprises a valve block 18 having six ports, 1 to 6, running through the solid block and each port being connected by means of tubing to various supply means and analyzing units not shown, and channels 7 and 8 in the surface of the block, a valve plate 19 having therein three channels 9 to 11, said valve plate being slidable upon the valve block in two positions so as to provide predetermined communication among the ports and channels of said block and the channels of said plate (as hereinafter disclosed), said plate being urged in slidable contact with said block by valve plate carrier 20 and tensioning means not shown so the passages form a gas tight system.

FIG. 2 and FIG. 3 illustrate the operation of a preferred form of the apparatus of this invention. The valve (see FIG. 1) which comprises the valve block 18 having the valve plate 19 slidably affixed thereto by valve plate carrier 20 is connected to a suitable chromatographic column 16 and a detector means 17 which is connected to the valve thereby forming a closed system.

In FIG. 2, the valve plate 19 is positioned so as to connect ports 1 and 6, by sample channel 9 of the plate, ports 2 and 3 by channel 10, and ports 4 and 5 by channel 11. Thus, a liquid or gaseous stream to be analyzed, entering the valve at port 1, flows through the valve block 18 to the valve plate 19, through sample channel 9 back to the valve block 18 at port 6, exiting to the sample vent through port 6. Simultaneously, a stream of carrier gas enters the valve block 18 at port 2, flows through channel 10 of the valve plate 19 to port 3, from which the carrier gas is directed through detector 17 to column 16, passes through the column in the opposite direction to the direction of flow during an analysis, returns to port 5 of valve block 18, thence flows through channel 11 of valve plate 19 to port 4 of the valve block 18 and exits to the vent. In this manner, a sample of the liquid or gaseous stream to be analyzed has been introduced into the sample channel while the column has been cleared of residues from a preceding sample analysis in a backflushing manner by the carrier gas stream.

Thereafter, as illustrated in FIG. 3, the valve plate 19 is shifted by the valve plate carrier 20 to its alternate position, so as to connect ports 2 and 5 by sample channel 9, ports 3 and 4 by channels 10, 7, and 11, and ports 1 and 6 by channel 8 of the valve block. Thus, the sample stream entering the valve block 18 at port 1 passes through channel 8 of the valve block 18 into port 6 of the valve block 18 and exits to a sample vent. Carrier gas, entering the valve block 18 through port 2 passes through sample channel 9 of the valve plate 19 picking up the sample to be analyzed, and thence passes through port 5 of the valve block 18 whence the carrier gas containing the sample to be analyzed is directed into and through the column 16. The gas stream exiting from the column 16 passes through detector 17 and from there back into the valve block 18 at port 3, through channel 10 of the valve plate 19 through channel 7 of the valve block 18, through channel 11 of the valve plate 19 to port 4 of the valve block 18 from which it is exited to a vent.

As can be seen, the valve block and valve plate assembly shown in FIG. 2 is in the combined backflushing and sampling position while that illustrated in FIG. 3 is in the sample injection and gas analyzing position.

In the preferred embodiment illustrated in the drawings a channel 8 is provided in the valve block to permit continuous or uninterrupted flow of sample stream when valve block 18 and valve plate 19 are in the position illustrated in FIG. 3. Continuous flow of the sample stream improves response time and lessens the likelihood of pressure transients, polymerization of certain streams and other problems. Additionally, the presence of channel 8 in the valve block 18 permits the use of a sample channel 9 in the valve plate 19 so small as to constitute a flow restriction in the absence of channel 8. It will be appreciated that while the presence of channel 8 provides these advantages, it is also contemplated that, within the scope of the present invention, the valve block could be employed without this channel and the sample stream may be interrupted during part of the cycle. Furthermore, it will be appreciated that a channel serving the same purpose as channel 8 could be incorporated into the valve plate instead of the valve block.

The valve block is preferably constructed of a corrosion resistant material, for example, a metal such as stainless steel, Hastelloy, tantalum or the like, or a suitable polymeric material, such as perfluorohydrocarbons, halogenated polyesters or the like. The valve plate is also constructed preferably of a corrosion-resistant material, such as a corrosion-resistant metal or polymeric material. Preferably the valve plate is constructed of or clad on the surface thereof with a corrosion-resistant, self-lubricating, sealing polymeric material such as Teflon or the like.

Detector means and chromatographic column used with this apparatus are conventional units and are well known in this art. Various detector means including for example, thermal conductivity types may be employed.

Carrier gas system used in this method may be helium, argon, nitrogen, methane or any other carrier gas or gases used in gas chromatographic analysis. Helium is the gas usually used in connection with thermal conductivity detectors because of its safety and response. Ionization detectors commonly use argon, nitrogen or helium. In analyses for hydrogen nitrogen is used because its response and linearity are much greater than those of helium, permitting operation with lower detector current, greatly increasing detector life. Nitrogen's availability, economy and safety make it preferred for such analyses.

Means may be provided to regulate the flow or flows of carrier gas to the sample valve, column and detector assembly. For example, the carrier gas may be passed through a nonbleed type pressure regulator upstream of the backflushing and sample valve. A flow control manifold may be provided whereby the carrier supply is split, different streams passing through flow restrictors to the programming valve means and the detector means as required by the particular arrangement.

The apparatus of the present invention is suitable for use in the analysis of various liquid or gaseous mixtures with accuracy and facility. As examples of such mixtures the following are mentioned as typical:

a. hydrocarbon mixtures such as mixtures of methane, ethane, propane and acetylene, b. chlorinated organics, such as mixtures of o-, m-, and p-chlorotoluenes, c. impurities in chlorine, hydrogen chloride and other inorganic chemical streams.

As will be evident to those skilled in this art, the chromatographic analysis system of this invention can be operated either manually or by automatic means. In the latter instance, a conventional electronic programmer can be utilized to establish a time cycle for control of the gas flows through the programming valve(s), column, and detector means and to transfer the detector signal to a recording means.

The apparatus and method of the present invention is not limited to use with a particular type of chromatographic column, but may be advantageously employed in conjunction with various chromatographic columns for various analyses, wherever an advantage is to be derived in simplifying a complex analysis procedure by combining sampling and backflushing procedures in a single valve thereby improving service and simplifying maintenance. The programming valve of the present invention may also be employed in series with other sampling valves. In this manner, several streams can be analyzed with no greater complexity than is present in a single backflushing analysis employing the valves known to the art heretofore. When other sampling devices are used in series with the present valve, the other sampling devices may sample either liquid or gaseous streams provided that all samples are suitable for the column and detector means employed.

It will be apparent to those skilled in the art that many variations and modifications of the invention as set forth hereinabove, may be made without departing from the spirit and scope of the invention. The invention is not to be construed as limited to those examples listed except as set forth in the appended claims.

What is claimed is:

1. Apparatus for rapid chromatographic analysis of liquid or gaseous mixtures comprising
   1 a programming valve;
   2 a chromatographic column having an inlet and an outlet; and
   3 a detector means having an inlet and an outlet;
   said programming valve communicating with the inlet of the chromatographic column and with the outlet of the detector means, the outlet of the column communicating with the inlet of the detector means; said programming valve including a valve block member having six ports and at least one channel, two of said ports forming the inlet and outlet for a stream of said liquid of gaseous mixture, and two of said ports forming the inlet and outlet for a carrier gas stream; a movable valve plate member positioned on one face of said valve block and having thereon a plurality of channels, said valve plate being movable by a valve plate carrier between two positions relative to the valve block, permitting selective communication of predetermined ports and a channel of the valve block with predetermined channels of the valve plate whereby; in a first position, a sample of said liquid or gaseous mixture is collected in the valve while simultaneously the carrier gas stream flows through the valve to the outlet side of the detector and, in a backflushing manner, through the detector and column and in a second position, the carrier gas stream flows through the valve, displacing the collected sample and the resultant mixture of sample and carrier gas is directed to the inlet side of the column.

2. Apparatus as claimed in claim 1 wherein said valve block includes a second channel which provides a continuous communication between said ports forming the inlet and outlet for a stream of said liquid or gaseous mixture, thereby permitting uninterrupted flow through said ports in either position of the valve plate relative to the valve block.

3. Apparatus as claimed in claim 2 wherein said stream to be analyzed is liquid.

4. Apparatus as claimed in claim 2 wherein said stream to be analyzed is gaseous.

5. Apparatus as claimed in claim 2 wherein said valve plate is movable by manual means.

6. Apparatus as claimed in claim 2 wherein said valve plate is movable by automatic means.

7. A programming valve comprising
a. a valve block member having six ports and at least one channel,
b. a movable valve plate member positioned on one face of said member being movable relative to the valve block member between two positions, whereby:

in a first position each valve plate channel provides communication between two ports of the valve block; and in a second position two valve plate channels provide communication between two valve block ports through a valve block channel while a third valve plate channel provides communication between two valve block ports.

8. A method for rapid chromatographic analysis of a liquid or gaseous mixture which comprises passing a stream of the mixture to be analyzed through the internal sample channel of six port programming valve thereby filling said sample channel with a measured volume of sample of said mixture while simultaneously passing a stream of carrier gas through said programming valve, to and through a detector means and a chromatographic column in a backflushing direction, and thereafter back into and through said programming valve whereby substantially all of the components of a previous analysis sample which were retained in said column are removed from said column then causing the carrier gas stream to flow into and through the sample channel to displace the sample therefrom, passing the carrier gas and sample from the programming valve into the column wherein a separation of components of the mixture occurs, through a detector means and back to said programming valve.

* * * * *